United States Patent Office 3,007,745
Patented Nov. 7, 1961

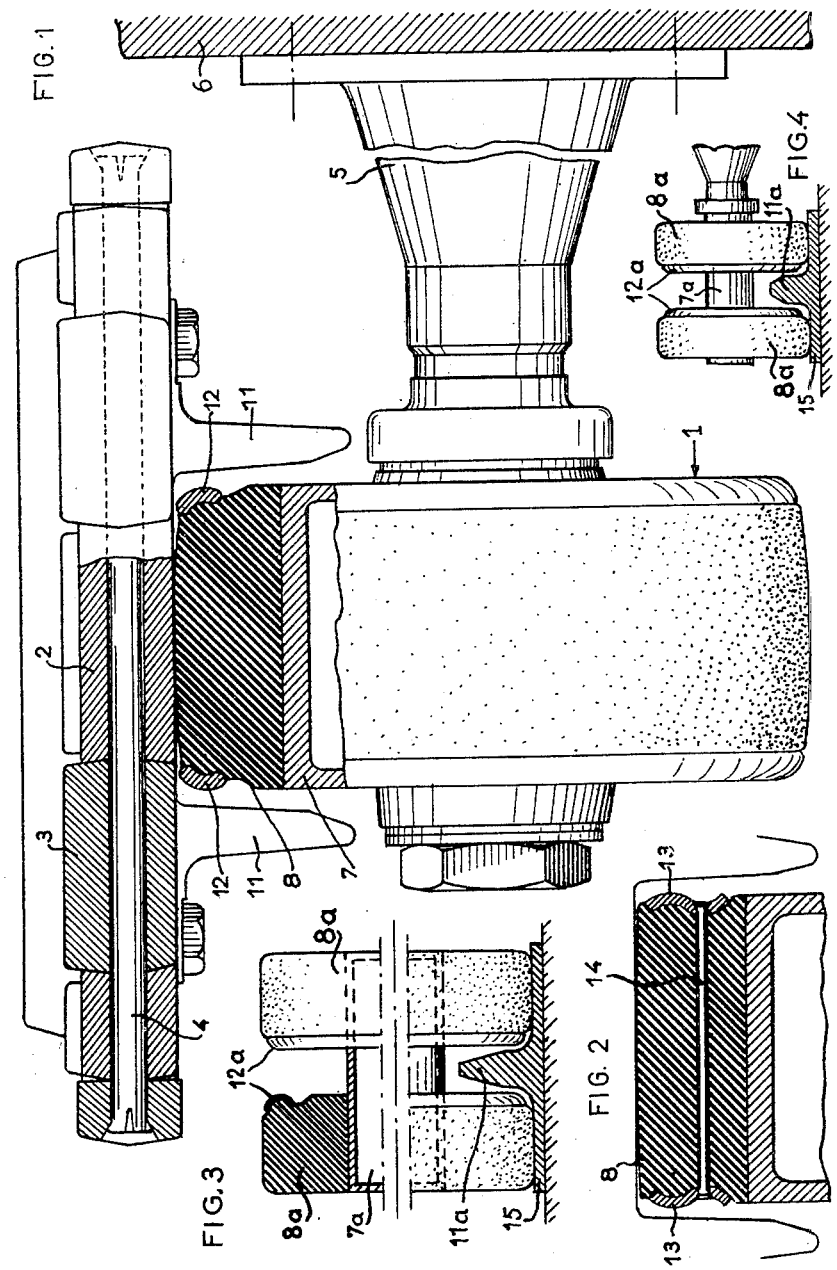

3,007,745
IDLE ROLLERS FOR TRACK-LAYING VEHICLES
Georges Even, 3 Blvd. Victor, Paris 15e, France
Filed Mar. 31, 1958, Ser. No. 725,168
Claims priority, application France Apr. 2, 1957
7 Claims. (Cl. 305—56)

My invention relates to the idle rollers of track laying vehicles. Under the term of "idle rollers" I include all all idle chain wheels and rollers, over which the endless band runs and is laterally guided, and viz., the wheels supporting the vehicle, the tension-wheel provided for adjusting the tension of the band and the guiding rollers which are sometimes provided for supporting the upper strand of the band.

Usually, such rollers comprise a steel body, the outer periphery of which is surrounded by a solid rubber rim. The arrangement is such that the band proper is only contacting the cylindrical surface of the rubber rim while lateral reactions between the band and the rollers are taken by the lateral faces of the steel body, said faces contacting the side faces of the teeth of the endless band.

I found that the above described, usual, arrangement presents quite a number of drawbacks. For instance, the entire structure, as well as the axes and the roller bearings of the rollers, must be exceedingly strong in order to be able to resist the heavy lateral shock transmitted from the band to the roller axles exclusively through rigid members. Besides, whenever a tooth of the band is brought into contact with the steel body of the roller, this contact takes place on an area of the steel body which is located at a considerable distance from the roller periphery and, hence, moves at a considerably lower linear speed than the said periphery. Since, on their part, the band and its teeth, run with a linear speed equal to that of the roller periphery (assuming no slippage occurs between the band and the rubber rim of the roller) any lateral shock necessarily results in relative sliding under heavy friction between the roller steel body and the band teeth, which causes rapid wear of the latter and primarily of the former. Furthermore, the wear of the roller steel body progressively reduces its axial size until the shocks finally affect the rubber rim which is then rapidly deteriorated.

Finally, the known devices of the described type are very noisy, due to the frequent shocks occurring between the rigid metal parts.

One object of my invention is to provide a caterpillar band idle roller which elimiates all the above-mentioned drawbacks.

Another object of my invention is to so design the roller that the lateral guiding of the endless band on said roller be ensured with damping of the resulting lateral shocks.

Still another object of my invention is to provide a roller of the type described offering to the teeth of the endless band a metallic guiding area located near the vicinity of its rubber rim whereby the linear speed of the said area is substantially equal to that of the said teeth which eliminates or at least reduces friction during mutual engagement.

A further object of my invention is to reduce the noise when the track laying vehicle is running.

A still further object of my invention is to reduce the weight and the cost of the idle rollers.

Another object of my invention is to provide an idle roller of the type described, formed by a rigid body pivoted on a rigid axle for free rotation in fixed axial position, a solid rubber rim, and annular, hard, for instance metallic, members mounted on the said solid rubber rim, preferably in the vicinity of the cylindrical outer face of the same and meant to bear against the teeth of the endless band in the axial direction only, in such a way that all the reactions of the caterpillar band on the roller be transmitted to the hub of the same through said rubber rim.

It is easy to understand that all parts of the roller according to my invention can be made in the most suitable materials. For instance, the body of the roller can be made of a light alloy, while the annular rigid elements, adherently mounted on the sides of the rubber rim, can be made of steel. Thus, the wear of the roller, its price and its weight, are considerably reduced. Besides, the noise is also surprisingly weak.

It must be noted that numerous methods are known for assembling by adhesion metal elements to natural or synthetic rubber bodies.

Besides, according to another feature of my invention the annular rigid elements located on both sides of the solid rim are connected by means of a number of draw-rods extending through axial holes provided in the solid rubber rim.

In an embodiment adapted to be used with an endless band provided with two rows of teeth, two annular rigid elements are provided, each attached to a lateral face of the flexible rim.

In alternative embodiments to be used with an endless band having one single row of teeth, there are used twin rollers, or one roller having two rims, each roller rim being provided with an annular rigid element attached to its inner lateral face.

Each element has preferably a convex outer face to cooperate with the endless band teeth.

It is particularly provided to give to the annular elements a cross section in the shape of an arc of circumference, or of a kidney.

In the case of an endless band comprising guiding teeth or members located in the mid plane of the band, the annular friction elements according to my invention shall be located on the sides of a central annular groove formed in the cylindrical outer surface of the solid, elastic rim.

Other objects and advantages of the invention will be apparent from the following detailed description, together with the accompanying drawings submitted for purpose of illustration only and not intended to limit the scope of the invention, reference being had for that purpose to the sub-joined claims.

In these drawings:

FIG. 1 is an elevational view with parts broken away, of an endless band guiding roller according to the invention.

FIG. 2 is a partial radial sectional view of an alternative embodiment of the rim of the roller shown in FIG. 1;

FIG. 3 is a part view of an embodiment of rolling wheel according to the invention cooperating with an endless band having one single row of teeth;

FIG. 4 shows caterpillar twin rolling wheels according to the invention.

Referring first to FIG. 1, there is generally shown at 1 an idle roller provided to support and guide the upper strand of an endless band. The links of said band are articulated with one another by means of draw rods. One of these draw rods is shown at 4 while the two corresponding consecutive links of the band are shown at 2 and 3, respectively.

The roller 1 is pivoted on a stud 5 fixedly secured on a supporting member 6. The manner in which the roller 1 is pivoted on the stud 5 does not pertain to this invention; this pivoting may be ensured by any suitable conventional means, such as roller bearings, or the like.

The roller 1 essentially comprises a central body 7, for example made of a light alloy. The body 7 may be hollowed, as shown in the drawing, and it may be e.g., directly mounted on the outer race of a bearing.

The roller body 7 is surrounded by a rim 8 made of elastic material, such as rubber, strongly secured and, for example, adherized to the said body. The outer peripheral surface of the rim 8 is substantially cylindrical and slightly bulging, as shown. It is in permanent rolling engagement with the endless band.

The said band is laterally guided in both directions with respect to the roller 1, so that it cannot escape off the latter. Several arrangements are known for this purpose and it will be easily understood that the invention as defined in the preamble and described in detail hereunder, may be used with any one of these arrangements as well. However, the most usual dispositions are those shown in FIGS. 1, 2 and 3, respectively.

In the example shown in FIG. 1 the endless band is provided with two rows of teeth 11 and the lateral guiding of the caterpillar is ensured by both lateral faces of the roller 1 respectively adapted to act as abutments for one of the said teeth rows, the spacing between two consecutive teeth being sufficiently reduced to prevent the endless band from escaping off the roller 1 in the gaps.

In this embodiment, according to the invention, both outer faces of the rim 8 are fitted with metallic friction rings 12 secured to the rubber rim by any suitable means, such as adherizing.

In the construction shown in FIG. 1, these friction rings have a kidney-like cross section. The rim 8 has its axial thickness slightly reduced in the marginal zone around which the friction rings 12 are secured, so that the said rings do not normally rub against the teeth 11.

The friction rings 12 are preferably made of a hard metal, such as steel, since they are provided to resist friction against the endless band teeth.

Owing to this arrangement all stresses due, for example, to lateral shocks of the teeth 11 against the rings 12, are transmitted to the central body 7 of the roller through the rubber rim 8 so that they undergo a considerable damping, which protects the roller body 7, its bearing (if any) and its axle, and even the support 6 against the objectionable effects of such stresses. This damping action of the rim 8 also considerably reduces noise.

It may be pointed out that the composite structure of the roller according to the invention permits of selecting a suitable material for each member of the roller, so as to obtain an optimum efficiency. Thus, as already mentioned above, the friction rings 12 may be made of a very hard steel, since they are so small that their weight does not intervene; the rim 8 may be made of elastic material, such as rubber, since it does not support directly any shock, while it has to act as a shock absorber between the rings 12 and the roller body 7; finally, the latter may be made of a light alloy, since it only has to be rigid and is not directly subjected to any friction, the same being exclusively taken by the rings 12. Furthermore, in the examples shown, the said rings 12 are located in the immediate vicinity of the rim periphery so that whenever a shock brings one of them into contact with a tooth 11, it practically "rolls" on the latter instead of rubbing therealong as in known rollers.

In the alternative embodiment of FIG. 3, the endless band 15 lies on the ground.

It is provided with one single row of teeth 11a.

The idle rolling wheel which is shown in the drawing comprises a central metal portion 7a, e.g., made of a light alloy and two rubber rims 8a rolling on the endless track constituted by the band 15 each on one side of the single teeth row.

In this embodiment, the inner lateral face of each rim 8a is provided with a friction ring 12a, preferably near the periphery of the roller, as shown.

In the alternative embodiment shown in FIG. 4 the endless band is provided with twin rolling wheels, each of which is essentially constituted by a central portion such as 7a (cf. above) and a rubber rim 8a. Each rubber rim 8a has its inner lateral face fitted, as previously, with a friction ring 12a.

The embodiment of FIGS. 3 and 4 operate in the same manner as that of FIG. 1.

In FIG. 2 is shown an alternative construction which may be used in the device of FIG. 1, as well as in those of FIGS. 3 and 4. In this construction, the metal friction rings 13 which, as previously, are secured as by adherizing of the rubber rim 8, are furthermore connected by means of transverse draw rods 14 passing from side to side throughout the rim 8. In this example, the cross-section of the rings 13 has the shape of an S, so that the ends of the rods 14 may be protected in the outerly concave portion of that S whereby they do not risk coming into contact with the endless band teeth.

While the invention has been described with particular reference to preferred embodiments it is not intended to limit the scope of the invention to the embodiments illustrated, nor otherwise than the terms of the subjoined claims.

What I claim is:

1. An idle roller to be associated with an endless band having at least one row of guiding teeth, for rolling engagement of its peripheral surface on the inner surface of said band, with lateral guiding of the latter, said roller being mounted on an axle for free rotation in a fixed axial position and having a rim, a tire tread constituted by an axially and radially undivided body of elastically deformable material surrounding said rim and strongly secured thereon, and a rigid annular member strongly secured on a lateral face of said body in lateral abutment relationship with said teeth, whereby all mutual reactions between the band and the roller axle, whatever their directions, are transmitted through the tire tread, either directly or with the interposition of said rigid annular member.

2. An idle roller according to claim 1, wherein said rigid annular member is secured on said lateral face of the elastically deformable body in the immediate vicinity of its periphery, so that it practically rolls on the band teeth when the same are brought into abutment with it.

3. An idle roller to be associated with an endless band having two parallel rows of guiding teeth, for rolling engagement of its peripheral surface on the inner surface of said band with lateral guiding of the latter, said roller comprising an inner annular metal member adapted to be pivoted on an axle for free rotation in a fixed axial position, an outer annular solid body of elastically deformable material and of axially and radially undivided section surrounding said member and strongly secured thereon and a rigid annular lateral member strongly secured on each lateral face of said body in lateral abutment relationship with the teeth of one of said rows.

4. An idle twin-roller structure to be associated with an endless band having one row of guiding teeth, for rolling engagement of its peripheral surface on the inner surace of said band with lateral guiding of the latter, said twin-roller structure comprising a body member having two spaced rim portions adapted to be pivoted on an axle for free rotation in a fixed axial position, a rubber tread secured to each rim portion and adapted to accommodate said teeth between them and a rigid annular member strongly secured only to the inner lateral face of each one of said treads adjacent to its periphery and spaced from the respective rim portion in lateral abutment relationship with one of said teeth lateral faces.

5. An idle roller according to claim 1, wherein said rigid annular member has a convex outer surface.

6. An idle roller according to claim 3, wherein said rigid annular members have an S-shaped cross-section.

7. A wheel for track type vehicles, comprising a body having a rim, a ring of elastic material bonded to said rim, said ring having a circumferential track engaging surface and two opposite annular side walls, and a metal ring supported only by and secured to at least one of said side walls concentric therewith and adjacent to the track engaging surface, the outer diameter of said metal ring being slightly smaller than the diameter of said track engaging surface and the inner diameter of the metal ring being greater than the diameter of the rim.

References Cited in the file of this patent

UNITED STATES PATENTS

| | | |
|---|---|---|
| 2,149,278 | Christmas | Mar. 7, 1939 |
| 2,329,901 | Herrington | Sept. 21, 1943 |
| 2,393,369 | Hait | Jan. 22, 1946 |

FOREIGN PATENTS

| | | |
|---|---|---|
| 813,066 | France | Mar. 16, 1937 |
| | (1st add. to 47,745) | |
| 720,092 | Germany | Apr. 24, 1942 |
| 734,380 | Germany | Apr. 14, 1943 |
| 737,756 | Germany | July 22, 1943 |